United States Patent [19]
Hubler

[11] Patent Number: 6,064,840
[45] Date of Patent: May 16, 2000

[54] METHOD AND APPARATUS FOR SCHEDULING DUPLEX COPY JOBS BY SHIFTING COPY SHEET INTO AN AVAILABLE PITCH TO CREATE A SKIPPED PITCH BETWEEN COPY SETS

[75] Inventor: Lawrence C. Hubler, Fairport, N.Y.

[73] Assignee: Xerox Corporation, Stamford, Conn.

[21] Appl. No.: 09/318,621

[22] Filed: May 26, 1999

[51] Int. Cl.[7] .................................................. G03G 21/00
[52] U.S. Cl. ............................................. 399/82; 399/381
[58] Field of Search ................................. 399/76–78, 82, 399/382, 401, 381, 397, 403–405; 271/291; 355/24

[56] References Cited

U.S. PATENT DOCUMENTS

| | | | |
|---|---|---|---|
| 4,453,841 | 6/1984 | Bobick et al. | 347/16 |
| 4,475,156 | 10/1984 | Federico et al. | 709/102 |
| 4,918,490 | 4/1990 | Stemmle | 399/401 |
| 4,934,681 | 6/1990 | Holmes et al. | 271/3.18 |
| 4,935,786 | 6/1990 | Veeder | 399/401 |
| 5,095,342 | 3/1992 | Farrell et al. | 399/401 |
| 5,159,395 | 10/1992 | Farrel et al. | 399/401 |
| 5,289,251 | 2/1994 | Mandel et al. | 399/407 |
| 5,303,017 | 4/1994 | Smith | 399/403 |
| 5,337,135 | 8/1994 | Malachowski et al. | 399/401 |

*Primary Examiner*—Quana Grainger
*Attorney, Agent, or Firm*—Oliff & Berridge, PLC

[57] ABSTRACT

A method and system for scheduling copy sheets in a duplex copy mode uses an interleave mode in which at least one skipped pitch is provided between copy sheets along a paper transport path. The method includes transporting first and second copy sheets along the paper transport path, determining whether the paper transport path contains an even or an odd pitches and creating a skipped pitch when an even number of pitches is detected and the first and second copy sheets are in adjacent pitches and from different sets. According to another method, first and second copy sheets in first and second sets, respectively, are transported along a paper transport path, a determination is made as to whether the first and second copy sheets occupy adjacent pitches, and one of the first and second copy sheets is shifted into an adjacent available pitch to create a skipped pitch between the first and second copy sheets when it is determined that the first and second copy sheets occupy adjacent pitches.

20 Claims, 7 Drawing Sheets

METHOD AND APPARATUS FOR SCHEDULING DUPLEX COPY JOBS BY SHIFTING COPY SHEET INTO AN AVAILABLE PITCH TO CREATE A SKIPPED PITCH BETWEEN COPY SETS

BACKGROUND OF THE INVENTION

1. Field of Invention

This invention is directed generally to printing duplex copy sheets from electronic page information, especially suitable for low cost electrostatographic, ink jet, ionographic or other on-demand page printers with an endless duplex paper path loop. More particularly, this invention relates to such printers which are integrated with on-line finishing devices.

2. Description of Related Art

The terminology "copiers", and "copies", as well as "printers" and "prints", is used alternatively herein. The terminology "imaging" and "marking" is used alternatively herein and refers to the entire process of putting an image, from a digital or analog source, onto paper. The image can then be Permanently fixed to the paper by fusing, drying, or other means. It will be appreciated that the invention may apply to any system in which the images are made electronically, including digital copiers.

Imaging systems, such as printers or copiers, typically include copy sheet paper paths through which copy sheets, such as plain paper sheets, that are to receive an image are conveyed and imaged. The process of inserting copy sheets into the copy sheet paper path and controlling the movement of the copy sheets through the paper path to receive an image on one or both sides is referred to as "scheduling". Copy sheets are printed by being passed through a copy sheet paper path that includes a marking station one or more times. Copy sheets which are printed on only one side, referred to as "simplex copy sheets", and in a single color usually pass through the copy sheet paper path a single time.

Multipass printing is used to print images on both sides of a copy sheet, referred to as "duplex printing", or to print a simplex sheet in multiple colors, where one pass is used for each color. There are two general modes in which copy sheets to be multipass printed can be scheduled: "burst mode" and "interleave mode".

When scheduling in "burst mode", copy sheets are inserted into, imaged, and output from the copy sheet paper path without any "skipped pitches" existing between each consecutive copy sheet. Various methods for scheduling copy sheets in "burst mode" are disclosed in, for example, the above incorporated U.S. Pat. No. 5,095,342.

A "pitch" is the portion (or length) of the copy sheet paper path in the process direction which is occupied by a copy sheet as it moves through the copy sheet paper path. A "skipped pitch" occurs when there is a space between two consecutively output copy sheets which is long enough to hold another copy sheet. Accordingly, when scheduling in "burst mode", copy sheets are output from the copy sheet paper path, and thus the imaging system, at a maximum rate because no skipped pitches exist between each consecutive copy sheet.

When scheduling copy sheets in "interleave mode", skipped pitches are provided between each consecutively scheduled copy sheet. That is, a space is provided between each copy sheet inserted into and output from the copy sheet paper path. While other copy sheets may be eventually inserted in the space between two consecutively input sheets, these other sheets are inserted at a later time and are thus "interleaved" with the previously inserted copy sheets.

The "interleave mode" of copy sheet scheduling is typically employed in imaging systems which are capable of duplex printing, i.e., forming images on both sides of a copy sheet. Many imaging systems which are capable of duplex printing include copy sheet paper paths in the shape of a loop. The scheduling process involves: a) inserting a copy sheet into the loop; b) forming an image on a first side of the copy sheet at an imaging station; c) inverting the copy sheet so that a second side of the copy sheet will face the imaging station when the copy sheet is reconveyed past the imaging station; d) forming an image on the second side of the copy sheet at the imaging station; and e) outputting the copy sheet from the paper path loop toward a final destination, such as a tray, a binder, finishing devices, stackers, etc.

One reason why the "interleave mode" of scheduling is frequently used when duplex printing relates to the manner in which the original images are provided to the imaging station. For example, when the imaging system is using a recirculating document handler (RDH) to cycle a simplex document over a platen for exposure to a light source for forming duplex copies of the document, the imaging system exposes every other sheet in the simplex document so that a duplex copy of the document can be formed. For example, all even numbered pages in the document are exposed first to form a copy set consisting of copy sheets having even numbered pages on one side. Then, the odd numbered pages in the document are exposed, and these odd numbered pages are formed on the second side of the copy sheets containing the even numbered pages on side one.

The set/offset mechanism in Xerox's 4135 Stacker module is designed to offset single sheet sets arriving at a rate of 135 ppm. With a speed of up to 180 ppm (7 pitch) on Xerox's Cyclone 4180 photocopier, the Stacker offsetting module cannot easily be extended to handle the faster rate of the Cyclone. In order to utilize the existing design and maximize productivity in the duplex mode, the interleave mode can be utilized.

The interleave mode allows completed duplex prints to exit the Input/Output Terminal with an empty pitch between them. This empty pitch provides time for the output device, e.g., the 4135 Stacker or a Signature Book Maker (SBM), to perform its function, for example, offsetting, binding, registration, etc. Moreover, depending on pitch mode and set size, there are circumstances or conditions in which no skipped pitch is provided between copy sheets from different sets at the Input/Output Terminal. Therefore, there is insufficient time for the output device to perform its functions.

SUMMARY OF THE INVENTION

This invention provides systems and methods that permit copy sheets to be scheduled without adding skipped pitches when running in certain pitch modes, e.g., 7, 5, and 3 pitch modes containing an even number of pitches, while at the same time providing enough time for post-imaging devices to perform their functions, e.g., allowing enough time for the 4135 Stacker to collate, offset and register the duplex copy sheets.

With information flowing to the Input/Output Terminal regarding pitch mode and set size, the systems and methods of this invention can predict: 1) when two output sheets will exit the system in adjacent pitches and, 2) if these adjacent sheets occur at an interface between the two sets. If the systems and methods of this invention determine that the two adjacent sheets are within a set, nothing needs to be done because no offsetting is required. On the other hand, when the systems and methods of this invention determine that the two adjacent sheets are in different sets, action is taken to physically shift sheet one of the following set into an empty pitch created by the interleaving mode of operation. This action opens up an empty pitch between the sets that provides time for the existing offset mechanism to function.

One exemplary embodiment of the methods for scheduling copy sheets according to this invention includes transporting a first copy sheet from a first set of sheets and a second copy sheet from a second set of sheets along the paper transport path, determining whether the first and second documents occupy adjacent pitches, and shifting one of the first and second copy sheets into an adjacent available pitch to create a skipped pitch between the first and second copy sheets when it is determined that the first and second copy sheets occupy adjacent pitches. This scheduling method can involve duplex copy sheets positioned at a set interface. The shifting may involve mechanical shifting, for example, implemented using at least one of a servo, a stepper, and a control device positioned near an output of the paper transport path. Post imaging processing on the first and second copies may be performed as the skipped pitch reaches an output where the copy sheets are output.

In another exemplary embodiment of the methods for scheduling copy sheets according to this invention, a method of scheduling copy sheets in a duplex copy mode includes transporting first and second copy sheets along a paper transport path, determining whether the first and second copy sheets are in a common set, and shifting one of the first and second copy sheets to create a skipped pitch between the first and second copy sheets if the first and second copy sheets are in adjacent pitches and are not in the common set.

In another exemplary embodiment of the methods for scheduling copy sheets according to this invention, a method of scheduling duplex copy sheets using an interleave mode in which at least one skipped pitch is provided along a paper transport path. The method comprises transporting first and second copy sheets along the paper transport path, determining a number of pitches contained in the paper transport path, and creating a skipped pitch between the first and second copy sheets when an even number of pitches is detected and the first and second copy sheets are adjacent one another and from different sets.

One exemplary embodiment of a system that schedules copy sheets comprises a unit that transports a first copy sheet from a first set of sheets and a second copy sheet from a second set of sheets along a paper transport path, a unit that determines whether the first and second copy sheets occupy adjacent pitches, and a unit that shifts one of the first and second copy sheets into an adjacent available pitch to create a skipped pitch between the first and second copy sheets when the unit determines that the first and second copy sheets occupy adjacent pitches.

In another exemplary embodiment of the system of this invention, the apparatus according to this invention includes a transporter that transports first and second copy sheets along the paper transport path, a device that determines whether the first and second copy sheets are in a common set, and a shifter that shifts one of the first and second copy sheets to create a skipped pitch between the first and second copy sheets if the first and second copy sheets are adjacent one another and are not in the common set.

In another exemplary embodiment of the system of this invention, the system according to this invention includes a transporter that transports first and second copy sheets along the paper transport path, a control unit that determines a number of pitches in the paper transport path, and a delay/shifting device that creates a skipped pitch when an even number of pitches is detected in the first and second copy sheets are in adjacent pitches and are from different sets.

These and other objects and aspects of the invention will be described in and/or apparent from the following detailed description of exemplary embodiments of the systems and methods of this invention.

BRIEF DESCRIPTION OF THE DRAWINGS

The invention will be described in detail with reference to the following drawings in which like reference and numerals refer to like elements and wherein.

DETAILED DESCRIPTION OF PREFERRED EMBODIMENTS

This invention relates to duplex interleaving for systems as disclosed, for example, in U.S. Pat. No. 5,159,395, incorporated herein in its entirety by reference. While a specific printing system is shown and described, this invention may also be used with other types of printing systems such as ink jet, ionographic, etc.

Figure 1:
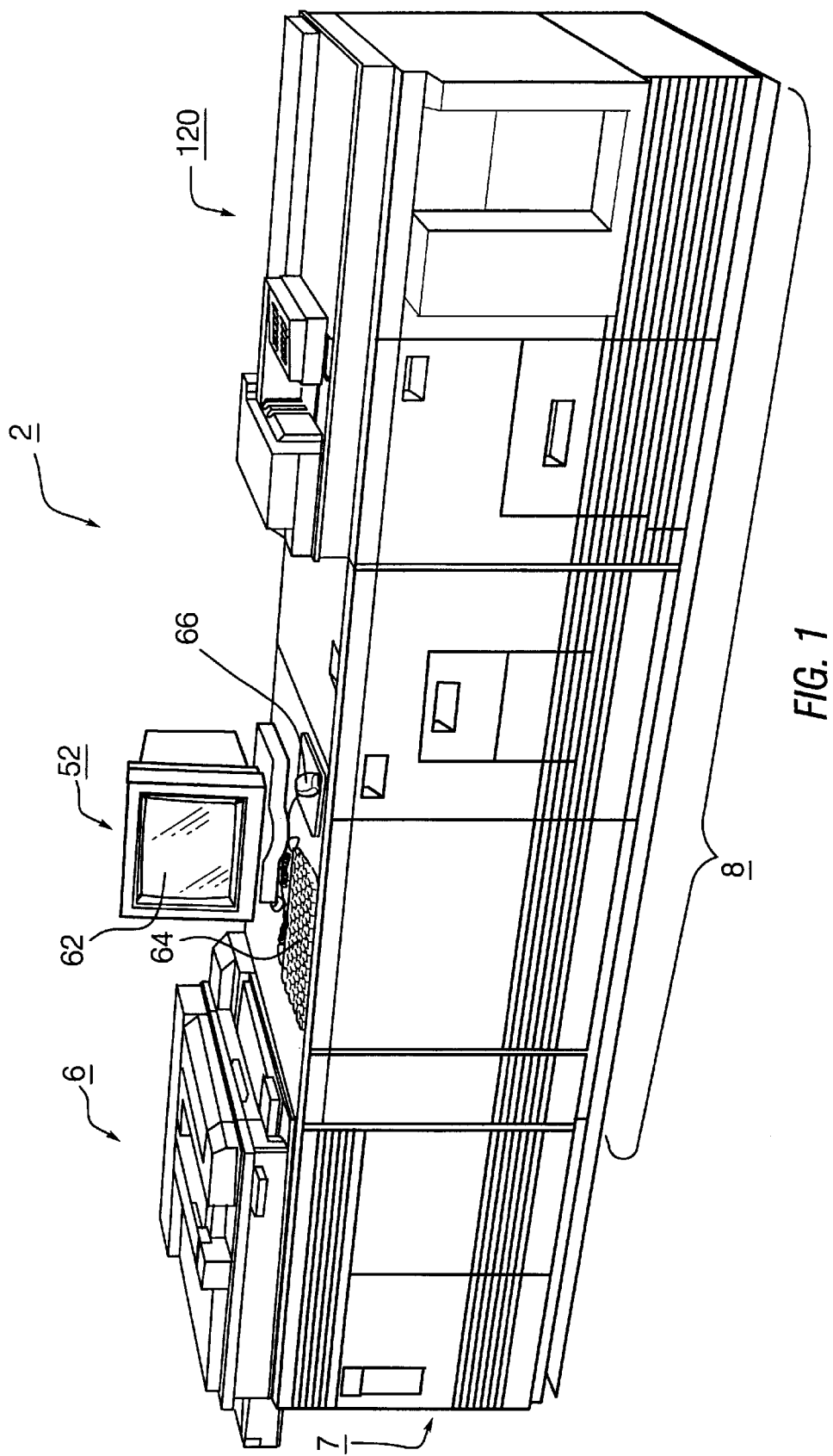
FIG. 1 is shows one exemplary embodiment of an electronic printing system according to this invention.
Figure 2:
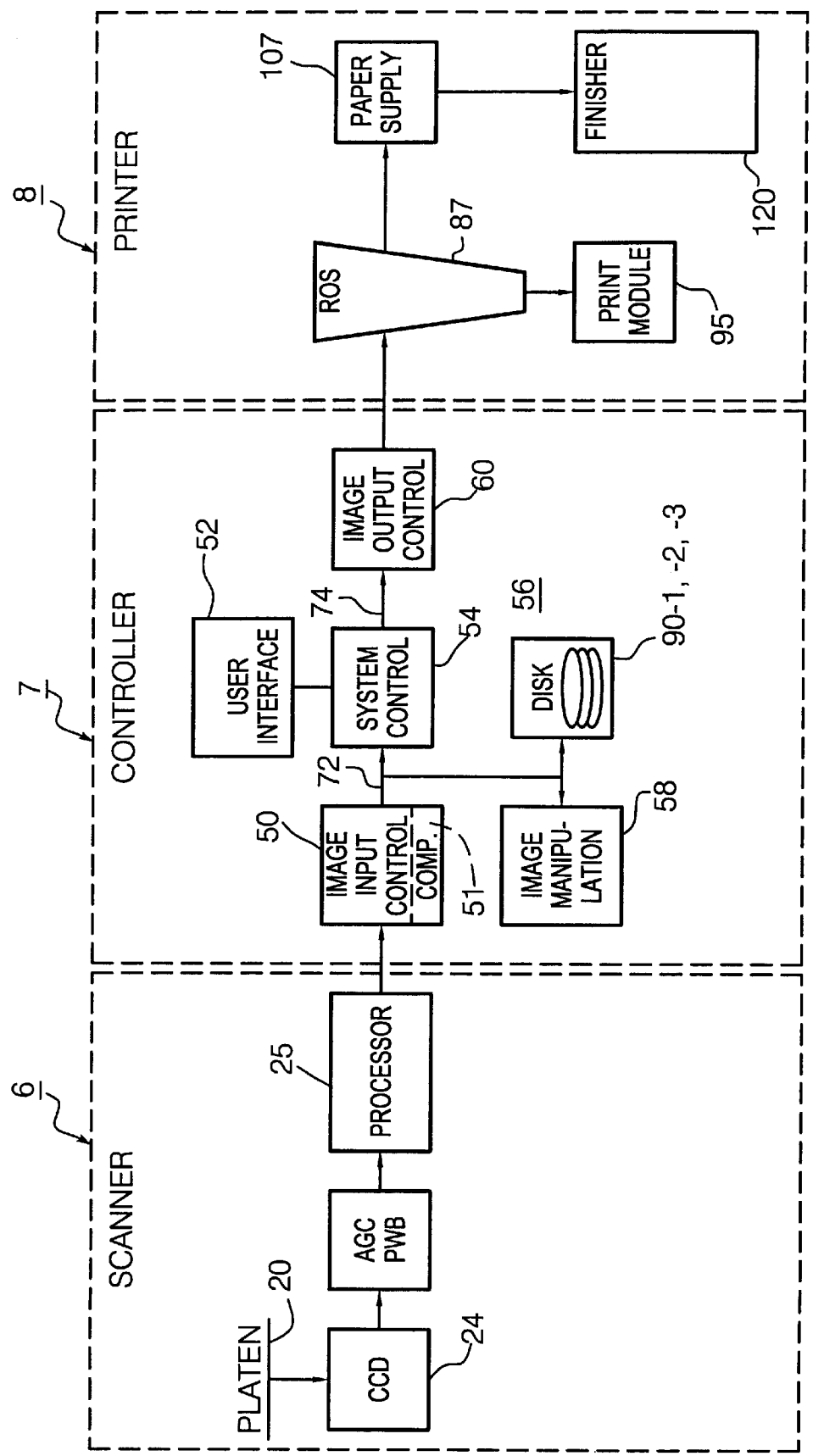
FIG. 2 is a block diagram depicting one exemplary embodiment of the elements of the printing system shown in FIG. 1.

FIGS. 1 and 2 show an exemplary laser based printing system (or imaging device) for processing print jobs in accordance with the teachings of the present invention. The print system 2, for purposes of explanation, is divided into a scanner section 6, a controller section 7, and a printer section 8. While a specific printing system is shown and described, this invention may be used with other types of printing systems such as ink jet, ionographic, etc.

Figure 3:
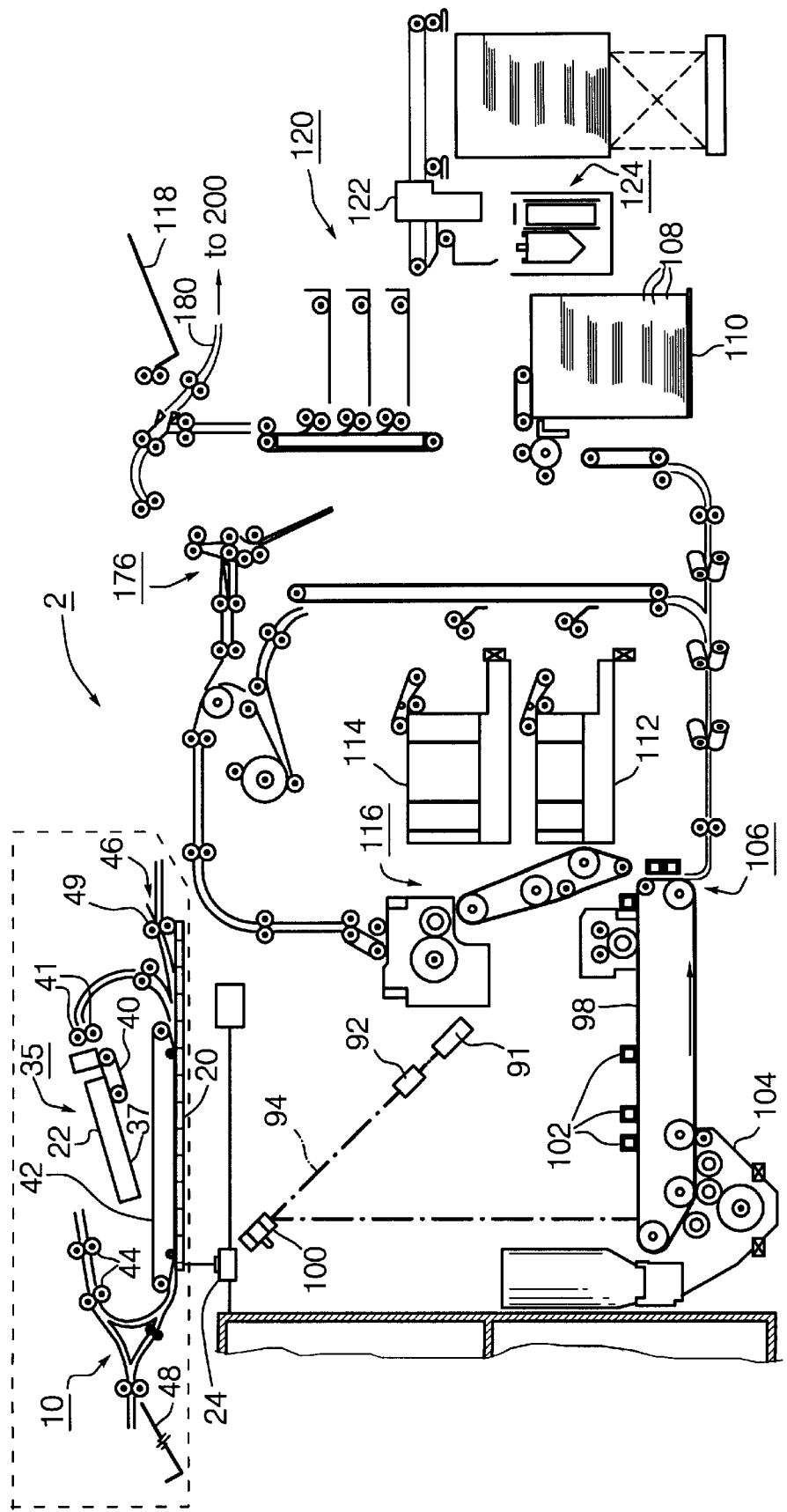
FIG. 3 is a plan view depicting one exemplary embodiment of the mechanical components of the printing system shown in FIG. 1.

As shown in FIGS. 2 and 3, the scanner section 6 incorporates a transparent platen 20 on which the document 22 to be scanned is located. One or more linear arrays 24 are supported for reciprocating scanning movement below the platen 20. A conventional lens and mirrors (not shown) cooperate to focus the array 24 on a line like segment of the platen 20. The document is scanned when on the platen 20. The array 24 provides image signals or pixels representative of the image scanned which, after suitable processing by a processor 25, are output to the controller section 7.

The processor 25 converts the analog image signals output by the array 24 to digital image signals and processes the image signals as required to enable the system 2 to store and handle the image data in the form required to carry out the programmed job. The processor 25 also provides enhancements and changes to the image signals such as filtering, thresholding, screening, cropping, reduction/ enlarging, etc. Following any changes and adjustments in the job program, the document must be rescanned.

The documents 22 to be scanned may be located on the platen 20 for scanning by an automatic document handler (ADF) 35 operable in either a Recirculating Document Handling (RDH) mode or a Semi-Automatic Document Handling (SADH) mode. The automatic document handler 35 can be formed as a separate component selectively attachable to the print system 2, as indicated by the dashed box in FIG. 3. A manual mode including a Book mode and a Computer Forms Feeder (CFF) mode are also provided, the latter to accommodate documents in the form of computer fanfold. For RDH mode operation, the automatic document handler 35 has a document tray 37 in which the documents 22 are arranged in stacks or batches. The documents 22 in the tray 37 are advanced by a vacuum feed belt 42 onto the platen 20 where the document is scanned by the array 24. Following scanning, the document is removed from the platen 20 and discharged into the catch tray.

For operation in the CFF mode, computer forms material is fed through a slot 46 and advanced by feed rolls 49 to a document feed belt 42, which in turn advances a page of the fanfold material into position on the platen 20.

The printer section 8 comprises a laser type printer, and for purposes of explanation, is separated into a Raster Output Scanner (ROS) section 87, a Print Module Section 95, a Paper Supply Section 107, and a High Speed Finisher 120. The Raster Output Scanner 87 has a laser 90. The beam of the laser 90 is split into two imaging beams 94. Each beam 94 is modulated in accordance with the content of an image signal input by a modulator 92 to provide the dual imaging beams 94. The beams 94 are scanned across a moving photoreceptor 98 of the Print Module 95 by the mirrored facets of a rotating polygon 100 to expose two image lines on a photoreceptor 98 with each scan and to create the latent electrostatic images represented by the image signal input to the modulator 92. The photoreceptor 98 is uniformly charged by one or more corotrons 102 at a charging station preparatory to exposure by the imaging beams 94. The latent electrostatic images are developed by a developer 104 and transferred at a transfer station 106 to a print media 108 delivered by the Paper Supply Section 107. The print media 108 may comprise any of a variety of sheet sizes, types and colors. For transfer, the print media 108 is brought forward in timed registration with the developed image on the photoreceptor 98 from either a main paper tray 110 or from auxiliary paper trays 112 or 114. The developed image transferred to the print media 108 is permanently fixed or fused by a fuser 116 and the resulting prints discharged to either an output tray 118, to a high speed finisher 120, or through a bypass 180 to some other downstream finishing device, which could be a low speed finishing device such as a Signature Book Maker 200 or a 4135 Stacker. The high speed finisher 120 includes a stitcher 122 for stitching or stapling the prints together to form books and a thermal binder 124 for adhesively binding the prints into books.

As shown in FIG. 2, the controller section 7 is, for explanation purposes, divided into an image input controller 50, a User Interface (UI) 52, a system controller 54, a main memory 56, an image manipulation section 58, and an image output controller 60.

The scanned image data input from the processor 25 of the scanner section 6 to the controller section 7 is compressed by an image compressor/processor 51 of the image input controller 50, as described in U.S. Pat. No. 5,159,395. As the image data passes through the compressor/processor 51, it is segmented into slices N scanlines wide, each slice having a slice pointer. The compressed image data, together with slice pointers and any related image descriptors providing image specific information, such as height and width of the document in pixels, the compression method used, pointers to the compressed image data, and pointers to the image slice pointers, are placed in an image file. The image files, which represent different print jobs, are temporarily stored in the system memory (not shown) which comprises a Random Access Memory or RAM pending transfer to the main memory 56 where the data is held pending use.

As shown in FIG. 1, the User Interface 52 includes a combined operator controller display having an interactive touchscreen 62, a keyboard 64, and a mouse 66. The User Interface 52 interfaces the operator with the printing system 2, enabling the operator to program print jobs and other instructions, to obtain system operating information, instructions, programming information, diagnostic information, etc. Items displayed on the touchscreen 62 such as files and icons are actuated by either touching the displayed item on the touchscreen 62 with a finger or by using the mouse 66 to point a cursor to the item selected and pressing a button on the mouse 66.

The main memory 56 has plural hard disks 90-1, 90-2, 90-3 for storing machine Operating System software, machine operating data, and the scanned image data currently being processed.

When the compressed image data in the main memory 56 requires further processing, or is required for display on the touchscreen 62 or the User Interface 52, or is required by the printer section 8, the data is accessed from the main memory 56. Where further processing other than that provided by the processor 25 is required, the data is transferred to the image manipulation section 58, as described in U.S. Pat. No. 5,159,395, where the additional processing steps, such as collation, make ready, decomposition, etc., are carried out. Following processing, the data may be returned to the main memory 56, sent to the User Interface 52 for display on the touchscreen 62, or sent to the image output controller 60.

Image data output to the image output controller 60 is decompressed and readied for printing by image generating processors 86, as described in U.S. Pat. No. 5,159,395. Following this, the data is output by dispatch processors to the printer section 8. Image data sent to the printer section 8 for printing is normally purged from the main memory 56 to make room for new image data.

Figure 4:
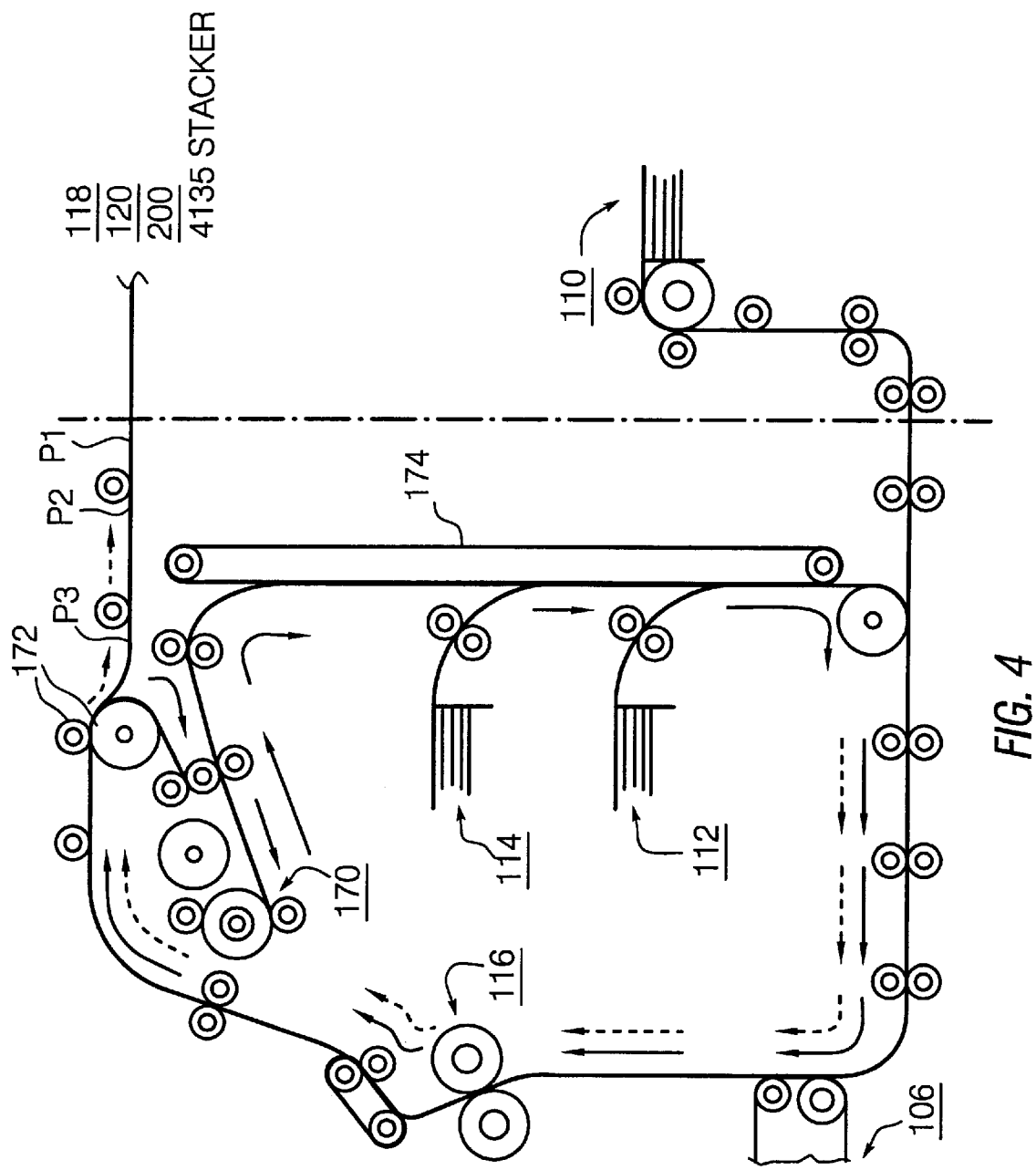
FIG. 4 is a plan view illustrating one exemplary embodiment of the duplex and simplex paper paths along which sheets are conveyed through the system of FIG. 3.

FIG. 4 is a plan view illustrating the duplex and simplex paper paths through which sheets are conveyed in the system of FIG. 1. In FIG. 4, the paper transport path through which a sheet travels during duplex imaging is illustrated by the arrowed solid lines, whereas the path through which a sheet to be simplex imaged travels is illustrated by the arrowed broken lines. After an appropriately sized sheet is supplied from one of the feed trays 110, 112 or 114, the sheet is conveyed past the image transfer station 106 to receive an image. The sheet then passes through the fuser 116, where the image is permanently fixed or fused to the sheet. After passing through rollers 172, gates (not shown) either allow the sheet to move directly to a final destination, such as the output tray 118, the high speed finisher 120, the 4135 Stacker or the Signature Book Maker 200, or deflects the sheet into a single sheet inverter 170. If the sheet is either a simplex sheet or a duplex sheet having both images formed on both sides of the duplex sheet, the sheet will be conveyed directly to its final destination. If the sheet is a duplex sheet printed with an image on only the first side, the gate will deflect the sheet into the inverter 170, where the sheet will be inverted and then fed to a belt 174 for recirculation past the transfer station 106 and the fuser 116 for receiving and permanently fixing the second image to the second side of the sheet. Examples of single sheet inverters usable with the present invention are disclosed in U.S. Pat. Nos. 4,918,490; 4,935,786, 4,934,681; and 4,453,841, each incorporated herein by reference in its entirety.

For a given paper path length, the duplex paper path architecture of the illustrated exemplary embodiment offers a shorter duplex loop time because there is no sheet settling time nor sheet reacquisition time which is typically required with duplex architectures that use a buffer tray. The absence of sheet buffering for the illustrated exemplary architecture decreases the size of the duplex sheet tracking buffers in the Input/Output Terminal control system and reduces the maximum number of duplex path purge sheets. By eliminating buffering and reacquisition of sheets, this architecture eliminates the job integrity problems associated with delayed detection of duplex tray misfeeds. That is, since systems that use duplex buffer trays frequently lead to job integrity problems due to more than one sheet being unintentionally fed from the buffer tray at a time, the elimination of the buffer tray eliminates this problem. Additionally, since less sheets exist in the duplex paper path at a time than when a buffer tray is employed, the controller that controls the imaging process needs to keep track of fewer copy sheets at a time. The single sheet inverter and duplex paper path employed in the illustrated example is capable of handling sheets ranging in width from 8 to 17 inches and ranging in length from 10 to 14.33 inches.

As defined herein, the width of a sheet for purposes of the copy sheet paper path is the length of the edge of that sheet which is parallel to the direction in which copy sheets are fed through the paper path, i.e., the process direction. Thus, as will be described below, since the smaller (8½×11 inch) sheets are fed with their long edge, the 11 inch edge, first, the "width" in the paper path is 8½ inches. Since large sheets such as 11×17 inch sheets are fed with their short edge, the 11 inch edge, first, their width in the paper path is 17 inches.

A machine controller generally controls all machine functions, including all sheet feeding. The controller is preferably a known programmable microprocessor system, as exemplified by extensive prior art, e.g. U.S. Pat. No. 4,475,156 and its references. Plural but interconnecting microprocessors may also be used at different locations. The controller conventionally controls all the machine steps and functions described herein, and others, including the operation the document feeder, all the document and copy sheet deflectors or gates, the sheet feeder drives, the downstream finishing devices 120–200 etc. As further taught in the references, the copier controller also conventionally provides for storage and comparison of the counts of the copy sheets, the number of copy documents recirculated in a document set, the desired number of copy sets and other selections and controls by the operator through the console or other panel of switches connected to the controller, etc. The controller is also programmed for time delays, jam correction, etc. Conventional path sensors or switches may be utilized to help keep track of the position of the documents and the copy sheets and the moving components of the apparatus by connection to the controller. In addition, the controller variably regulates the various positions of the gates depending upon which mode of operation is selected.

According to this invention, the manner in which sheets are scheduled for printing in the printing system is controlled based on a prediction when two output sheets will exit the system in adjacent pitches based on the pitch mode and set size. Pitch mode is defined as the number of integral images placed on the photoreceptor. Pitch mode is a function of image width which is usually equal to paper width. Fundamentally, the duplex loop size in pitches is a function of pitch time, paper width, the duplex loop length and velocities throughout the loop. Given a constant photoreceptor surface speed, which is necessary for a Raster Output Scanner based imaging system, specifically the frequency of copy sheet deliveries, the frequency of copy sheet deliveries is strictly a function of pitch mode. It is not a function of duplex loop size.

A number of scheduling methods for increasing printer productivity by intermixing copy sheets are disclosed in U.S. Pat. No. 5,095,342, incorporated herein by reference in its entirety. The methods as disclosed in U.S. Pat. No. 5,095,342 can be used to determine the order and position in which the copy sheets will be processed in the duplex paper path. Information that is used to schedule the copy sheets includes the pitch mode and the set size. The pitch mode is a function of the image width or the paper width, as described above. The set size is determined from the number of sheets counted within a given set of documents to be copied. This information flows to the Input/Output Terminal. With this information, flow tables showing the predicted skipped pitches can be created, given that the copier is in the interleave mode for copying duplex documents.

There are two basic cases when operating in the interleave mode. The first case, Case 1, occurs when the paper handling loop contains an odd number of pitches, e.g., 8, 6 and 4 pitch modes having 9, 7 and 5 pitches, respectively. The sequencing always presents output sheets with an empty pitch between them, as can be explained below in conjunction with Table 1.

TABLE 1

Input/Output Terminal Print Sequencing In Copy Handling Loop
Case 1 (1 page sets)
(1st# = loop sequence; 2nd# = set number,
3rd#: 1 = side 1, 2 = side 2, 0 = open pitch)

| 8 Pitch Mode | 6 Pitch Mode | 4 Pitch Mode |
|---|---|---|
| 1  1-1  | 1  1-1  | 1  1-1  |
| 2  0    | 2  0    | 2  0    |
| 3  2-1  | 3  2-1  | 3  2-1  |
| 4  0    | 4  0    | 4  0    |
| 5  3-1  | 5  3-1  | 5  3-1  |
| 6  0    | 6  0    | 1  1-2  |
| 7  4-1  | 7  4-1  | 2  4-1  |
| 8  0    | 1  1-2  | 3  2-2  |
| 9  5-1  | 2  5-1  | 4  5-1  |
| 1  1-2  | 3  2-2  | 5  3-2  |
| 2  6-1  | 4  6-1  | 1  6-1  |
| 3  2-2  | 5  3-2  | 2  4-2  |
| 4  7-1  | 6  7-1  | 3  7-1  |
| 5  3-2  | 7  4-2  | 4  5-2  |
| 6  8-1  | 1  8-1  | 5  8-1  |
| 7  4-2  | 2  5-2  | 1  6-2  |
| 8  9-1  | 3  9-1  | 2  9-1  |
| 9  5-2  | 4  6-2  | 3  7-2  |
| 1  10-1 | 5  10-1 | 4  10-1 |
| 2  6-2  | 6  7-2  | 5  8-2  |
| 3  11-1 | 7  11-1 | 1  11-1 |
| 4  7-2  | 1  8-2  | 2  9-2  |
| 5  12-1 | 2  12-1 | 3  12-1 |
| 6  8-2  | 3  9-2  | 4  10-2 |
| 7  13-1 | 4  13-1 | 5  13-1 |
| 8  9-2  | 5  10-2 | 1  11-2 |

TABLE 1-continued

Input/Output Terminal Print Sequencing In Copy Handling Loop
Case 1 (1 page sets)
(1st# = loop sequence; 2nd# = set number,
3rd#: 1 = side 1, 2 = side 2, 0 = open pitch)

| 8 Pitch Mode | | 6 Pitch Mode | | 4 Pitch Mode | |
|---|---|---|---|---|---|
| 9 | 14-1 | 6 | 14-1 | 2 | 14-1 |
| 1 | 10-2 | 7 | 11-2 | 3 | 12-2 |
| 2 | 15-1 | 1 | 15-1 | 4 | 15-1 |
| 3 | 11-2 | 2 | 12-2 | 5 | 13-2 |
| 4 | 16-1 | 3 | 16-1 | 1 | 16-1 |
| 5 | 12-2 | 4 | 13-2 | 2 | 14-2 |
| 6 | 17-1 | 5 | 17-1 | 3 | 17-1 |
| 7 | 13-2 | 6 | 14-2 | 4 | 15-2 |
| 8 | 18-1 | 7 | 18-1 | 5 | 18-1 |
| 9 | 14-2 | 1 | 15-2 | | etc. |
| 1 | 19-1 | 2 | 19-1 | | |
| 2 | 15-2 | 3 | 16-2 | | |
| 3 | 20-1 | 4 | 20-1 | | |
| 4 | 16-2 | 5 | 17-2 | | |
| 5 | 21-1 | 6 | 21-1 | | |
| 6 | 17-2 | 7 | 18-2 | | |
| 7 | 22-1 | | etc. | | |
| 8 | 18-2 | | | | |
| 9 | 23-1 | | | | |
| | etc. | | | | |

Table 1 represents the sequence of the copy sheets as they are conveyed along the paper transport path, as shown in FIG. 4. For example, in the 8 pitch mode, a copy sheet is fed from one of the feed trays 110, 112 and 114 into the paper transport path. Side one of the copy sheet then receives an image at the image transfer station 106. The copy sheet occupies the first pitch, and the designation "1-1" indicates that side one of the first set has received an image from the image transfer station. The second pitch is not occupied by a copy sheet, and is therefore a skipped pitch ("0"). In the first nine (9) pitches, side one of the first five (5) copy sheets receive images at the image transfer station 106, with skipped pitches ("0") between them.

The first copy sheet then is transported past the fuser station 116 to fix the transferred image on side one. The first copy sheet is then transported to the inverter 170 so that side two of the copy sheet can be exposed to the image transfer station 106 and the fuser station 116. Side two (1-2) of the copy sheet one is followed by side one of the copy sheet six (6-1). However, because both sides of the first copy sheet have received images, the first copy sheet is not again sent to the inverter 170 for recirculation. Rather, the completed document is sent to the output tray 118 or for further processing, e.g., by the speed finisher 120, the 4135 Stacker or the Signature Book Maker 200.

As completed duplex copy sheet one is conveyed to the output, the copy sheet 6 is conveyed through the inverter 170 to transfer and fix an image to side two of the copy sheet 6. Thus, a skipped pitch is present downstream of copy sheet one. The skipped pitch allows adequate time for post-image processing devices to perform their functions. For example, the empty pitch in the output stream provides adequate time for the offset mechanism of the 4135 Stacker to handle output from the Cyclone 4180.

As can be seen from Table 1, the 8, 6 and 4 pitch modes always provide a duplex copy sheet next to a simplex copy sheet at each set interface. For example, the copy sheet 5-1 (simplex document) is next to the copy sheet (duplex document) at the first set interface. Thus, the simplex document (5-1) will be inverted and recirculated into the image transfer and fuser stations 106 and 116 while the duplex document (1-2) is transferred to the output with a skipped pitch on either side of the duplex document because the simplex documents are diverted to the inverter.

In Case 1, an empty pitch always exists between each of the duplexed copy sheets as they exit the Input/Output Terminal, including copy sheets from different sets. Therefore, the output device has time to perform its functions, and it is not necessary to add or provide for any additional skipped pitches between copy sets.

The second case, Case 2, occurs whenever the paper handling loop contains an even number of pitches, e.g., 7, 5 and 3 pitch modes having 8, 6, and 4 pitches, respectively. The Input/Output Terminal output sequence will periodically deliver duplex copy sheets in two successive pitches, as seen below in Table 2.

TABLE 2

Input/Output Terminal Print Sequencing In Copy Handling Loop
CASE 2 (1 page sets)
(1st# = loop sequence; 2nd# = set number,
3rd#: 1 = side 1, 2 = side 2, 0 = open pitch)

| 7 Pitch Mode | | 5 Pitch Mode | | 3 Pitch Mode | |
|---|---|---|---|---|---|
| 1 | 1-1 | 1 | 1-1 | 1 | 1-1 |
| 2 | 0 | 2 | 0 | 2 | 0 |
| 3 | 2-1 | 3 | 2-1 | 3 | 2-1 |
| 4 | 0 | 4 | 0 | 4 | 0 |
| 5 | 3-1 | 5 | 3-1 | 1 | 1-2 |
| 6 | 0 | 6 | 0 | 2 | 3-1 |
| 7 | 4-1 | 1 | 1-2 | 3 | 2-2 |
| 8 | 0 | 2 | 4-1 | 4 | 4-1 |
| 1 | 1-2 | 3 | 2-2 | 1 | 5-1 |
| 2 | 5-1 | 4 | 5-1 | 2 | 3-2 |
| 3 | 2-2 | 5 | 3-2 | 3 | 6-1 |
| 4 | 6-1 | 6 | 6-1 | *4 | 4-2 |
| 5 | 3-2 | 1 | 7-1 | *1 | 5-2 |
| 6 | 7-1 | 2 | 4-2 | 2 | 7-1 |
| 7 | 4-2 | 3 | 8-1 | 3 | 6-2 |
| 8 | 8-1 | 4 | 5-2 | 4 | 8-1 |
| 1 | 9-1 | 5 | 9-1 | 1 | 9-1 |
| 2 | 5-2 | *6 | 6-2 | 2 | 7-2 |
| 3 | 10-1 | *1 | 7-2 | 3 | 10-1 |
| 4 | 6-2 | 2 | 10-1 | *4 | 8-2 |
| 5 | 11-1 | 3 | 8-2 | *1 | 9-2 |
| 6 | 7-2 | 4 | 11-1 | 2 | 11-1 |
| 7 | 12-1 | 5 | 9-2 | 3 | 10-2 |
| *8 | 8-2 | 6 | 12-1 | 4 | 12-1 |
| *1 | 9-2 | 1 | 13-1 | 1 | 13-1 |
| 2 | 13-1 | 2 | 10-2 | 2 | 11-2 |
| 3 | 10-2 | 3 | 14-1 | 3 | 14-1 |
| 4 | 14-1 | 4 | 11-2 | *4 | 12-2 |
| 5 | 11-2 | 5 | 15-1 | *1 | 13-2 |
| 6 | 15-1 | *6 | 12-2 | 2 | 15-1 |
| 7 | 12-2 | *1 | 13-2 | 3 | 14-2 |
| 8 | 16-1 | 2 | 16-1 | 4 | 16-1 |
| 1 | 17-1 | 3 | 14-2 | | etc. |
| 2 | 13-2 | 4 | 17-1 | | |
| 3 | 18-1 | 5 | 15-2 | | |
| 4 | 14-2 | 6 | 18-1 | | |
| 5 | 19-1 | 1 | 19-1 | | |
| 6 | 15-2 | 2 | 16-2 | | |
| 7 | 20-1 | 3 | 20-1 | | |
| *8 | 16-2 | 4 | 17-2 | | |
| *1 | 17-2 | 5 | 21-1 | | |
| 2 | 21-1 | *6 | 18-2 | | |
| 3 | 18-2 | *1 | 19-2 | | |
| 4 | 22-1 | 2 | 22-1 | | |
| 5 | 19-2 | 3 | 20-2 | | |
| 6 | 23-1 | 4 | 23-1 | | |
| 7 | 20-2 | 5 | 21-2 | | |
| 8 | 24-1 | 6 | 24-1 | | |

The asterisked and bolded pitches indicate the regular intervals where duplexed sheets exit the Input/Output Terminal in two successive pitches. As compared to Case 1, i.e., the 8, 6 and 4 pitch modes, Case 2, i.e., the 9, 5 and 3 pitch modes, includes two duplex copy sheets at each set interface in adjacent pitches that are output. Unlike Case 1, the duplex documents are not always adjacent to simplex documents that are diverted to the inverter to create a skipped pitch at the output. The regularity of this sequence occurs in varying degrees depending on the number of sheets per set. Therefore, when running in the Case 2 mode and offsetting using the 4135 Stacker with the Cyclone 4180, the periodical occurrence of sheets in adjacent sets presents an offsetting problem because the mechanism is too slow. One solution is to predict the adjacent occurrences and insert or add an additional skipped pitch to create the necessary open pitch for offset mechanism operation. However, this solution results in lost productivity for each pitch which does not contain an image.

Figure 5:
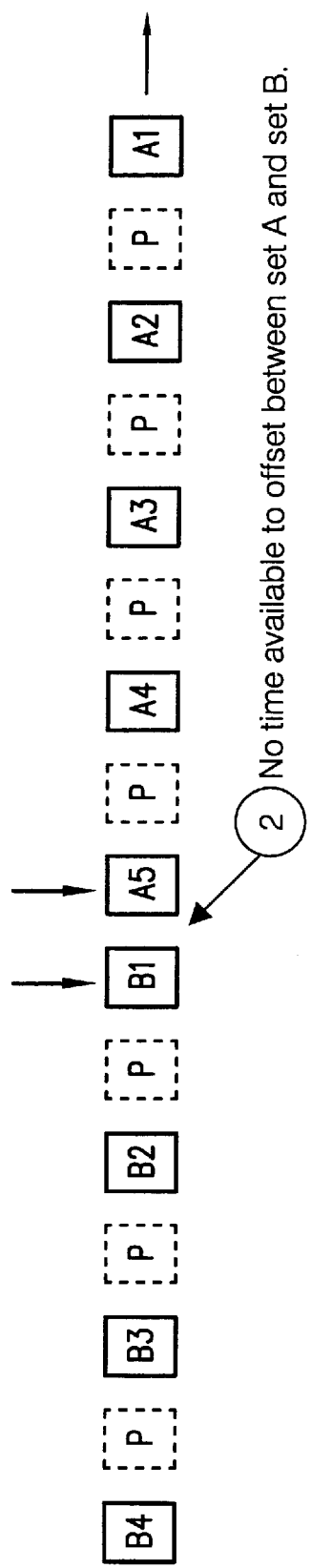
FIGS. 5 and 6 schematically illustrate the positions of copy sheets along a paper transport path.
Figure 6:
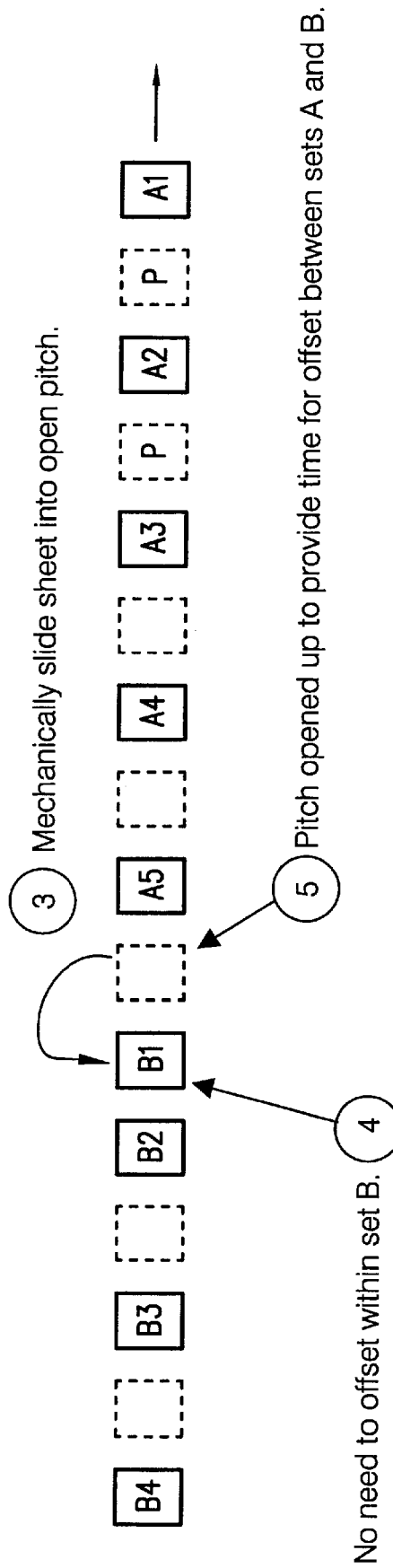

A better solution to the problem is schematically illustrated in FIGS. 5 and 6, which show the copy sheet sequence at the output. By contrast, Tables 1 and 2 do not show the copy sheet sequence at the output, but rather in the simplex and duplex paper transport loop which does not include skipped pitches, with the exception of the first copy set. As shown in FIG. 5, two sets A and B of copy sheets are scheduled in the system using the interleave mode. In FIG. 5, copy sheets A1–A5 are part of set A, and copy sheets B1–B4 are part of set B. Skipped pitches P are provided between various ones of the copy sheets along the paper transport path in the duplex copying mode. The skipped pitches P provide time for the output device to perform its function, e.g., offsetting, registration, etc.

However, there are conditions which generate copy sheets of different sets in adjacent pitches at a set interface, as shown in FIG. 5. This condition can be predicted, as shown in Table 2. This condition presents an offsetting problem because not enough time is provided to enable post-imaging processing to occur, e.g., a 4135 Stacker cannot keep up with the output from a 4180 Cyclone. If this condition exists, i.e., when it is determined that the two adjacent sheets B1 and A5 occur at a set interface, action is taken to shift one of the copy sheets away from the other into an available or open pitch P, which occurs normally during the interleave mode, in order to create a skipped pitch between the copy sheets of different sets. For example, action may be taken to physically shift or delay sheet B1 of set B into an already empty pitch created by the interleave mode of operation. Although not shown, it is also possible to shift or advance copy sheet A5 closer to copy sheet A4, to thereby provide a skipped pitch between sets A and B. Either action opens; up an empty pitch between the sets which provides time for the existing offset mechanism to function, as shown in FIG. 6.

There are circumstances when two sheets within a set, e.g., copy sheets B1 and B2 of set B, are positioned in adjacent pitches without a skipped pitch therebetween. If a determination is made that two adjacent copy sheets are within a set, there is no need for offsetting because there is sufficient time between sets A and B to perform processing. See FIG. 6.

The mechanism used to delay sheets into succeeding pitches can be a conventional roller pair, but is not the focus of this disclosure. The mechanism can be implemented anywhere within the sheet transporting system preferably just prior to output and downstream of the inverter 170. For example, a sheet accelerating or retarding roller pair can be provided just prior to the output at positions P1, P2 and P3, as shown in FIG. 4. The shifting device, be it rollers or otherwise, need not bring the copy sheets to a full stop to effect the desired shifting. It is also acceptable to simply slow down (or speed up) the copy sheet so that it moves to the adjacent available pitch. Servo, stepper, or other control devices are potential mechanisms within the sheet transporting systems which can be used to implement the shifting, so long as they do not impede other functions.

Non-mechanical solutions are also possible. For example, i naturally occurring lull in scheduling can be exploited to implement the required delay using a software based solution. In particular, it may be possible to further delay a copy sheet when it passes through the inverter 170. This could be advantageous because the copy sheet naturally comes to a compete stop at the inverter when the other or second side of the copy sheet is processed.

Figure 7:
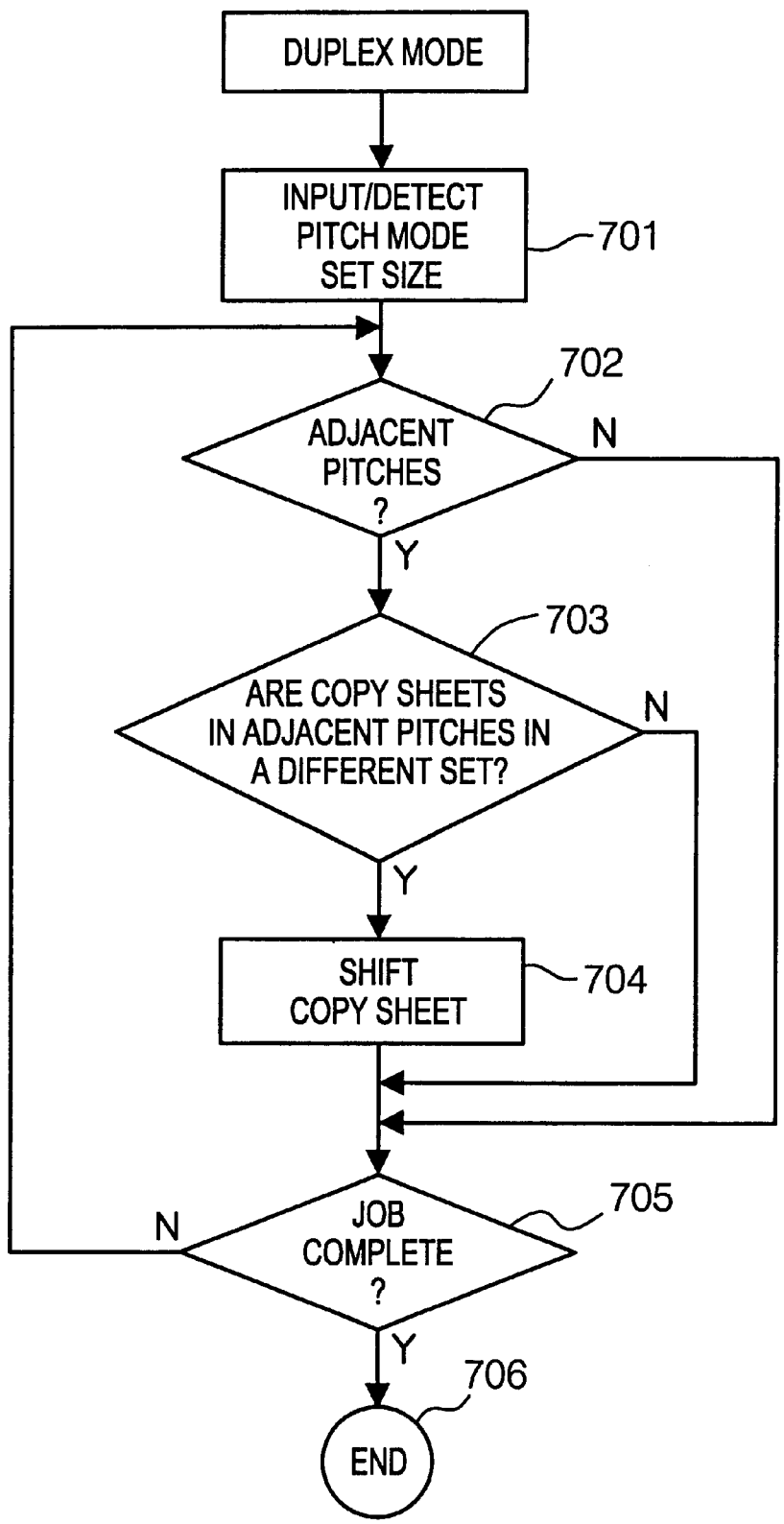
FIGS. 7 and 8 are flow charts outlining exemplary embodiments of the scheduling method according to this invention.
Figure 8:
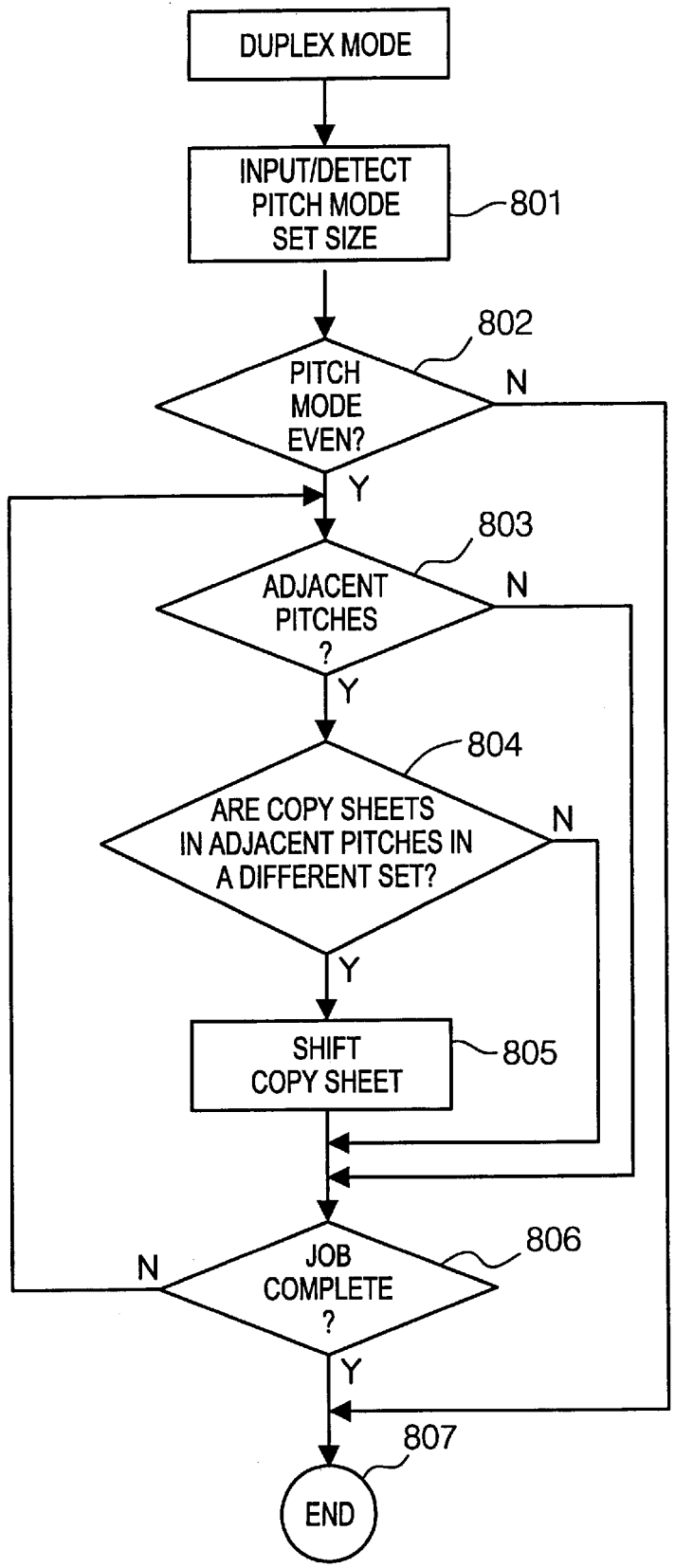

FIGS. 7 and 8 are flow charts outlining exemplary embodiments of the scheduling methods according to this invention. In step 701 of FIG. 7, the pitch mode and set size are either input or detected. In step 702, it is determined whether the copy sheets are in adjacent pitches. If the copy sheets are not in adjacent pitches, control continues to step 705. If the copy sheets are in adjacent pitches, control moves to step 703. In step 703, it is determined whether copy sheets in adjacent pitches are in a common set, or whether copy sheets of different sets are in adjacent pitches. If the determination in step 703 is "no", control moves to step 705. If the determination in step 703 is "yes", control continues to step 704. In step 704, one of the copy sheets is shifted so as to create a skipped pitch between copy sheets of different sets. Following shifting, control moves to step 705.

In step 705, a determination is made whether the job is complete. If the job is not complete, control jumps back to step 702. In contrast, if the job is complete, control continues to step 706. In step 706 the process ends.

The process in FIG. 8 is similar to FIG. 7, with the exception of step 802. In step 801 of FIG. 8, the pitch mode and set size are either input or detected. In step 802, the program determines whether the pitch mode is "even". If the determination in step 802 is "no", then the program simply ends at step 807 because an adequate number of skipped pitches is provided between each copy sheet, as shown in Table 1, i.e., copy sheets from sets A and B do not occur at a set interface, thus allowing adequate time for the post-image processing to occur. If the pitch mode is even, then steps 803–806 are carried out. In step 803, it is determined whether the copy sheets are in adjacent pitches. If the copy sheets are not in adjacent pitches, control continues to step 806. If the copy sheets are in adjacent pitches, control moves to step 804. In step 804, it is determined whether copy sheets in adjacent pitches are in a common set, or whether copy sheets of different sets are in adjacent pitches. If the determination in step 804 is "no", control moves to step 806. If the determination in step 804 is "yes", control continues to step 805. In step 805, one of the copy sheets is shifted so as to create a skipped pitch between copy sheets of different sets. Following shifting, control moves to step 806. In step 806, a determination is made whether the job is complete. If the job is not complete, control jumps back to step 803. In contrast, if the job is complete, control continues to step 807. In step 807 the process ends.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of scheduling copy sheets, comprising:

transporting a first copy sheet from a first set of sheets and second copy sheet from a second set of sheets along a paper transport path;

determining whether the first and second copy sheets occupy adjacent pitches; and shifting one of the first and second copy sheets into an adjacent available pitch to create a skipped pitch between the first and second copy sheets when it is determined that the first and second copy sheets occupy adjacent pitches.

2. The method of claim 1, wherein the first and second sets of sheets are duplex copy sheets.

3. The method of claim 1, wherein the first and second copy sheets are positioned at a set interface.

4. The method of claim 1, wherein the shifting involves mechanical shifting.

5. The method of claim 1, wherein determining includes creating a schedule based on pitch mode and set size of the first and second copy sheets.

6. The method of claim 1, further comprising performing post imaging processing on the first and second copy sheets as the skipped pitch reaches an output.

7. A method of scheduling copy sheets in a duplex copy mode, comprising:

transporting first and second copy sheets along a paper transport path;

determining whether the first and second copy sheets are in a common set; and shifting one of the first and second copy sheets to create a skipped pitch between the first and second copy sheets if the first and second copy sheets are in adjacent pitches and are not in the common set.

8. A method of scheduling duplex copy sheets using an interleave mode in which at least one skipped pitch is provided between first and second copy sheets along a paper transport path, the method comprising:

transporting the first and second copy sheets along the paper transport path;

determining a number of pitches contained in the paper transport path; and creating a skipped pitch between the first and second copy sheets when an even number of pitches is detected and the first and second copy sheets are adjacent one another and are from different sets.

9. The method of claim 8, wherein creating a skipped pitch comprises shifting of one of the first and second copy sheets to an available skipped pitch.

10. The method of claim 8, wherein no skipped pitch is created when an odd number of pitches is detected or when the first and second copy sheets are from a common set.

11. An apparatus for scheduling copy sheets, comprising:

means for transporting a first copy sheet from a first set of sheets and a second copy sheet from a second set of sheets along a paper transport path;

means for determining whether the first and second copy sheets occupy adjacent pitches; and means for shifting one of the first and second copy sheets; into an adjacent available pitch to create a skipped pitch between the first and second copy sheets when it is determined that the first and second copy sheets occupy adjacent pitches.

12. The apparatus of claim 11, wherein the first and second sets of sheets are duplex copy sheets.

13. The apparatus of claim 11, wherein the first and second copy sheets are positioned at a set interface.

14. The apparatus of claim 11, further comprising an output at an end portion of the paper transport path, wherein the means for shifting comprises a mechanical shifter positioned near the output.

15. The apparatus of claim 14, wherein the mechanical shifter comprises at least one of a servo, a stepper, and a control device.

16. The apparatus of claim 11, further comprising means for performing post imaging processing on the first and second sets during a period when the skipped pitch reaches an output port.

17. A system for scheduling copy sheets in a duplex copy mode comprising:

a transporter that transports first and second copy sheets along a paper transport path;

a control unit that determines whether the first and second copy sheets are in a common set; and a shifter that shifts one of the first and second copy sheets to create a skipped pitch between the first and second copy sheets if the first and second copy sheets are in adjacent pitches and are not in the common set.

18. An apparatus for scheduling duplex copy sheets using an interleave mode in which at least one skipped pitch is provided between first and second copy sheets along a paper transport path, said apparatus comprising:

a transporter that transports the first and second copy sheets along the paper transport path;

a control unit that determines a number of pitches contained in the paper transport path; and a delay/shifting device that creates a skipped pitch on the transporter between the first and second copy sheets when an even number of pitches is detected and the first and second copy sheets are adjacent one another and are from different sets.

19. The apparatus of claim 18, wherein the delay/shifting device includes a shifter that shifts one of the first and second copy sheets along the paper transport path to an available skipped pitch.

20. The apparatus of claim 18, wherein the delay/shifting device does not create a skipped pitch when the control unit determines that an odd number of pitches is created or that the first and second copy sheets are from a common set.

* * * * *